United States Patent [19]

Scaccia

[11] 4,240,905

[45] Dec. 23, 1980

[54] HIGH SOLIDS MIXTURE AERATION METHOD

[75] Inventor: Carl Scaccia, Depew, N.Y.

[73] Assignee: Union Carbide Corporation, New York, N.Y.

[21] Appl. No.: 31,296

[22] Filed: Apr. 18, 1979

[51] Int. Cl.³ .............................................. C02F 3/20
[52] U.S. Cl. .................................. 210/629; 162/57; 210/758; 261/93
[58] Field of Search ........................................ 210/2–9, 210/12, 14, 15, 198 R, 205, 208, 219, 221 M, 221 P, 63 R; 261/87, 91, 93; 162/57, 65

[56] References Cited

U.S. PATENT DOCUMENTS

| | | | |
|---|---|---|---|
| 490,525 | 1/1893 | Werner | 261/85 |
| 2,431,478 | 11/1947 | Hill | 162/57 |
| 2,928,661 | 3/1960 | MacLaren | 261/93 |
| 3,210,053 | 10/1965 | Boester | 210/208 |
| 3,408,051 | 10/1968 | McWhirter | 366/177 |
| 3,498,459 | 3/1970 | Bohnke | 210/208 |
| 3,775,307 | 11/1973 | McWhirter | 210/14 |
| 3,779,531 | 12/1973 | White | 210/219 |
| 3,815,879 | 6/1974 | Mikhailov et al. | 261/93 |
| 3,926,794 | 12/1975 | Vahldieck | 210/5 |
| 3,968,035 | 7/1976 | Howe | 210/15 |
| 3,969,446 | 7/1976 | Franklin | 261/87 |
| 4,058,433 | 11/1977 | Fuller et al. | 210/63 R |
| 4,123,317 | 10/1978 | Fritzvold et al. | 162/65 |

OTHER PUBLICATIONS

Budd et al., "High Purity Oxygen in Biological Sewage Treatment," *Sewage and Industrial Wastes*, Mar. 1957, pp. 237–253.
Scaccia et al., "Ozone Contacting: What is the Answer," Presented at Sym. on Adv. Ozone Tech., Union Carbide, Published, Oct. 1978 pp. 3 & 14.

*Primary Examiner*—Peter A. Hruskoci
*Attorney, Agent, or Firm*—Harrie M. Humphreys

[57] ABSTRACT

A method for aeration of pseudoplastic mixtures by providing an enclosure with H/D of 0.5–5.0, a vertical rotatable shaft having bubble shearing means with extending arms, upwardly injecting gas bubbles at radial locations, and repeatedly shearing the rising bubbles by the rotating arms.

8 Claims, 9 Drawing Figures

HIGH SOLIDS MIXTURE AERATION METHOD

BACKGROUND OF THE INVENTION

Figure 1:
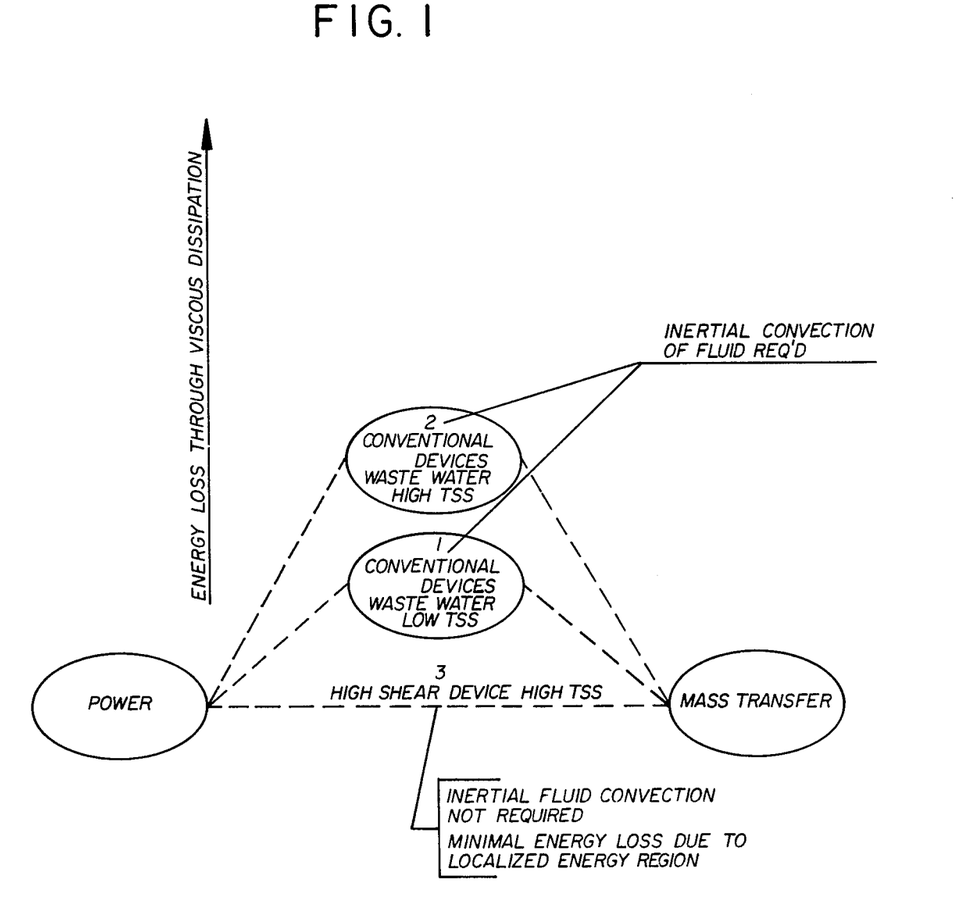
FIG. 1 is a block diagram showing the operating characteristics of prior art aeration devices and devices according to the method of this invention.

The prior art methods for effecting mass transfer of a relatively small quantity of gas into a relatively large volume of liquid via bulk liquid agitation inevitably involves the irreversible and therefore inefficient conversion of mechanical energy to heat energy through viscous dissipation. The magnitude of the viscous dissipation loss is related to the viscosity of the liquid. If viscosity is low, then the viscous dissipation component is small. This condition is common to most wastewater treatment systems where total solids concentrations are low in the influent wastewater, e.g., 0.01 weight %, and the viscosity of the liquid-solid mixture is similar to that of water alone. However, as the solids concentration of the fluid increases, it is well recognized that the viscosity of the resultant mixture rises in an exponential fashion. As a result, in conventional mass transfer processes involving bulk liquid agitation at increasingly higher solids concentrations, the input shaft energy that is wasted through viscous dissipation rises accordingly and is schematically illustrated in FIG. 1. The problem becomes acute with a wastewater sludge hving at least 2.5 weight % solids, since such sludges not only have a high viscosity, but also exhibit pseudoplastic behavior.

Referring now to FIG. 1, in the prior art aeration systems input shaft power is used to induce the bulkwise interial convection of fluid 1, which substantially decays through the turbulent cascade process and produces mass transfer. In the case of a low viscosity fluid, a wastewater with a low total suspended solids (TSS), the energy lost through viscous dissipation is relatively small. The magnitude of viscous dissipation is represented by the vertical displacement on the FIG. 1 schematic. In the higher viscosity case (wastewater with a high TSS), however, the necessity for bulkwise inertial convection of fluid 2 to induce mass transfer results in a much greater loss of energy via viscous dissipation and a more inefficient aeration system. It would be advantageous, therefore, if the step of mass transfer via convective mixing could be avoided while maintaining the same degree of mass transfer. In this case, the shaft power would be directly transformed into the work necessary for mass transfer by what would correspond to a single stage energy cascade 3. FIG. 1 seems to indicate that there would be no viscous dissipation losses; obviously this represents the ideal case. However, if viscous losses can be made so small that the diagram substantially represents a real situation, the aeration requirement can be satisfied at relatively low power densities.

One object of the present invention is to provide an aeration method for pseudoplastic liquid-solid mixtures which promotes gas dissolution by essentially a single stage cascade.

Another object of this invention is to provide such an aeration method characterized by substantially lower power densities than heretofore achieved in such mixtures.

Still another object of this invention is to provide such an aeration method which can be practiced with inexpensive yet reliable equipment.

A still further object of this invention is to provide an aeration method useful in aerobic digestion of pseudoplastic wastewater sludge which promotes a high degree of gas dissolution at relatively low power densities.

SUMMARY OF THE INVENTION

The invention relates to a method for the aeration of a high solids concentration pseudoplastic liquid-solid mixture such as wastewater sludge.

A simplified force balance on a gas bubble rising in a Newtonian fluid indicates that the rise rate is directly related to bubble size and is inversely related to the fluid viscosity. In other words, the combination of small bubbles and high viscosity will gereatly increase the bubble residence time. An increase in bubble residence time has a positive effect on the mass transfer rate. As a result, one might expect that simple diffusing of small gas bubbles in a well-known manner may provide adequate mass transfer performance. However, a high solids concentration fluid, such as wastewater sludge, is a non-Newtonian pseudoplastic material. As used herein, the phrase "pseudoplastic material" refers to those materials in which the viscosity varies inversely with the rate of shear, as for example, discussed in *Transport Phenomenon*, Bird, Stewart and Lightfoot, John Wiley & Sons, Inc, 1960, pp 11-13. As a result, as the bubble rises upwardly through such mixtures, its wake has a lower effective viscosity than the bulk fluid. After a period of operation, therefore, the bubbles tend to effectively form a set of "tunnels" of an effectively lower viscosity through the mixture. Within these "tunnels," the rate of bubble coalescence increases, increasing the bubble size which together with the lower effective viscosity significantly reduces the bubble residence time and the mass transfer rate.

By the method of this invention, one can take full advantage of the potential benefits accorded by the increased viscosity characteristics of the thick liquid-solid mixture while avoiding the complications introduced by its pseudoplastic nature. Bubbles injected into the enclosure bottom are repeatedly sheared at spaced intervals as they rise in the enclosure thereby preventing the formation of the low viscosity "tunnels." The average bubble size remains low and the effecitve viscosity high, yielding higher mass transfer rates. All this is achieved with substantially no power penalty arising from the viscous nature of the fluid since the bubble shearing means are designed solely to shear bubbles while avoiding both axial and radial pumping.

More specifically, this invention provides a method for continuously aerating a high solids concentration pseudoplastic liquid-solid mixture having a total solids concentration of at least 2.5 weight % comprising the steps of (a) providing a sludge aeration enclosure having an equivalent height H to equivalent diameter D ratio H/D between 0.5 and 5.0; (b) providing within said enclosure: (i) at least one vertical rotatable shaft having at least two bubble shearing means connected thereto each with at least two symmetrically disposed outwardly extending arms forming a bubble shear assembly having a maximum equivalent arm length r; (ii) each bubble shearing means with an equivalent arm frontal width W such that the W/r ratio is less than 0.1; (iii) having a system maximum equivalent arm length R, such that the system maximum equivalent arm length R is at least 25% of the enclosure equivalent diameter D, and (iv) said bubble shearing means being vertically spaced from each other on said vertical rotatable shaft such that the ratio of the equivalent arm frontal width W to shearing means vertical spacing S is between 0.005 and 0.04; (c) introducing said liquid-solid mixture to said enclosure; (d) upwardly injecting aeration gas bubbles at the lower end of said enclosure at a multiplicity of radial locations with the radius of the outermost location at least 40% of the maximum equivalent arm length, r, such that said gas bubbles rising into the liquid-solid mixture pass through a substantial fraction of the area swept by said bubble shearing means; (e) rotating the vertical shaft so as to provide a constant level of turbulence intensity at the level of each bubble shearing means while maintaining the shaft power density below 1.5 SHP/1000 U.S. gallon capacity of said enclosure; (f) repeatedly shearing the rising gas bubbles by rotating arms into minute gas bubbles; and (g) continuing at least the gas bubble injection (d) and rotating (e) such that the mixture retention time is at least 15 minutes.

As used herein, "enclosure equivalent diameter" D is determined in accordance with the following equation (1) where A equals the enclosure arithmetic average cross-sectional area (from top to bottom) and N equals the number of bubble shear assemblies in the enclosure.

$$D = \left[\frac{4A}{N\pi}\right]^{\frac{1}{2}} \quad (1)$$

As used herein, "equivalent height" H refers to the arithmetic average liquid-solid mixture depth in the enclosure.

Also as used herein, the "maximum equivalent arm length", r of the bubble shear assembly refers to the arithmetic average length of the longest "two outwardly extending arms" (in the transverse direction of the enclosure) on a bubble shear assembly where the arms of different bubble shearing means may be of varying length.

Also as used herein, the "equivalent arm frontal width" W refers to the arithmetic average frontal width of each arm on each bubble shearing means.

Finally, as used herein, the "system maximum equivalent arm length" R is determined in accordance with the following equation (2) where the numerator equals the sum of the squares of the maximum equivalent arm length r for each shear assembly in the enclosure, and the denominator, N is again the number of bubble shear assemblies in the enclosure $$R = \left[\frac{\Sigma r^2}{N}\right]^{\frac{1}{2}} \quad (2)$$

For example, if the aeration assembly has three bubble shearing means each with outwardly extending arms of different lengths, the maximum equivalent arm length r is based on the arithmetic average length of the two bubble shearing means with the longest arms in the tranverse direction perpendicular to the rotating shaft axis.

Normally, the rotating arms of a particular shear assembly will be of the same length, so that the transverse distance between the outer tips of each arm is 2R, and at least 50% of the enclosure equivalent diameter D. If however the arms of a particular bubble shear assembly are of different lengths, the maximum equivalent arm length r is the arithmetic average length for the two arms of such bubble shear assembly having the longest lengths in the transverse direction perpendicular to the rotating shaft axis.

This invention may also be practiced in enclosures with multiple vertical shaft-bubble shear assemblies positioned within the enclosure at different locations in the transverse locations. This may be desirable if the enclosure is too large to insure adequate aeration with only one shear assembly, or it may be preferred to use two or more smaller shear assemblies instead of a single large shear assembly. In this instance, each shear assembly must have at least two symmetrically disposed outwardly extending arms, with a maximum equivalent arm length r such that the system maximum equivalent arm length R is at least 25% of the enclosure equivalent diameter D.

For practicing the invention with multiple shear assemblies, the maximum equivalent arm length R for the system is once again determined by equation (2) and the enclosure equivalent diameter D is determined by equation (1). As noted, the system maximum equivalent arm length R must be at least 25% of the enclosure equivalent diameter D. In a similar fashion, the equivalent height H to equivalent diameter D ratio H/D must be between 0.5 and 5.0. Finally, the ratio of the equivalent frontal width W of each bubble shearing means on a bubble shearing assembly to the maximum equivalent arm length r of each bubble shear assembly W/r must be below 0.1. This embodiment differs from the embodiment where only a single shear assembly is used in a given enclosure. In that embodiment, the maximum equivalent arm length r is identical to the system maximum equivalent arm length R.

DESCRIPTION OF THE PREFERRED EMBODIMENTS

Figure 2:
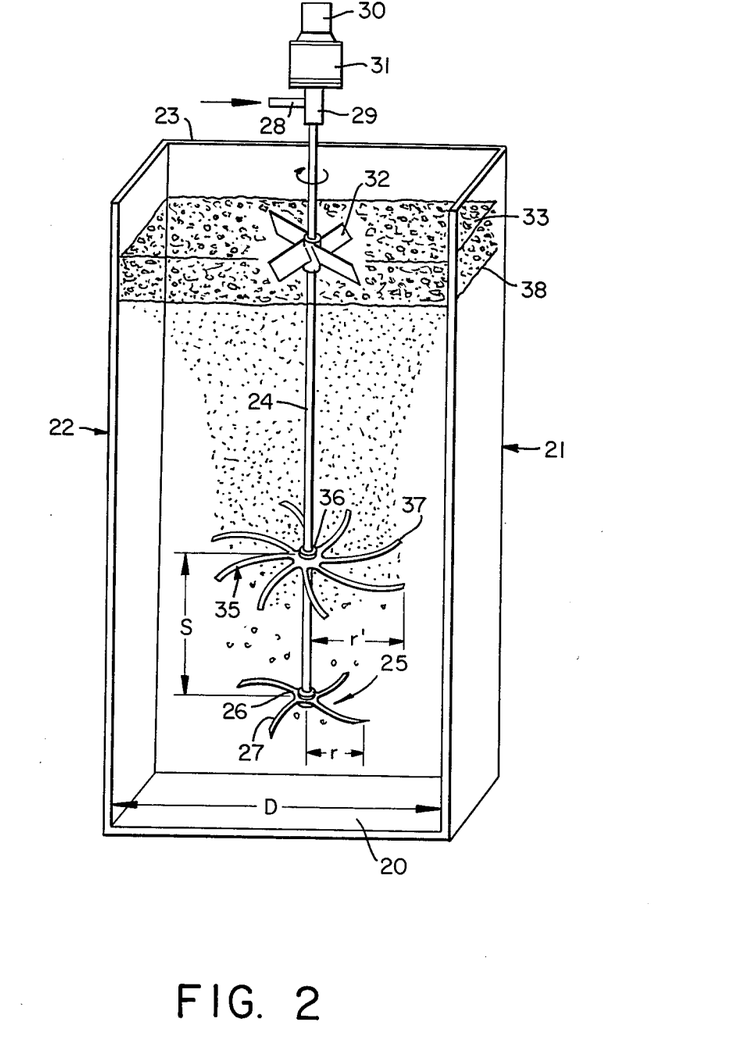
FIG. 2 is a schematic drawing of apparatus including a rotatable gas sparger which may be operated in accordance with this invention.

Referring now to FIG. 2, there is shown a sludge aeration enclosure comprising floor 20, sidewalls 21 and 22, a back wall 23, and an unillustrated front wall. Other enclosure shapes such as circular sidewalls may be employed. Also, one or more of the walls may be earthen. The enclosure is filled with pseudoplastic liquid-solid mixture such as wastewater sludge having a total solids concentration of at least 2.5 weight %. The equivalent height H to equivalent diameter D ratio H/D of the enclosure must be between 0.5 and 5.0. Preferably this ratio is in the range of 1.0 to 3.0.

Vertical rotatable shaft member 24 is positioned deep in the enclosure and gas sparging assembly 25 is connected to the hub 26. The sparging assembly may be a conventional rotating sparger well known in the art as for example described in McWhirter et al. U.S. Pat. No. 3,775,307, consisting of radially extending hollow sparging arms 27 provided with gas openings. Preferably the rotating sparger 25 satisfies the dimensional requirements of the bubble shearing means required to practice this invention, and constitutes one such means in addition to its function as the aeration gas bubble injection means. The shaft member 24 is hollow and the gas is introduced through gas conduit 28 to member 24 by means of rotating union 29. The other end of union 29 is connected to motor 30 through gear reducing means 31.

Foam breaker 32 is preferably positioned on shaft 24, and may for example be a pitched-blade turbine of well-known construction. It has been observed that in the practice of this method that there is a tendency to form a relatively stable foam 33. Foam breaker 32 serves to prevent the growth of this foam to a level that may create a nuisance.

Spaced upwardly from the gas sparging assembly 25 is a first bubble shearing means 35 attached to shaft 24 through hub 36. The shearing means has eight symmetrically disposed outwardly extending arms 37. Since rotating sparger 25 functions as the second of the at least two bubble shearing means in this particular embodiment, it is included in the calculation of the value for the maximum equivalent arm length r, and accordingly, the value of the system maximum equivalent arm length R which must satisfy the relationship, $R \geq 0.25$ D. Shear arms 27 and 37 are designed with frontal width W such that the ratio of W to shearing means vertical spacing S is between 0.005 and 0.04.

To minimize the amount of convective mixing that the bubble shearing means provides, the ratio of the shear arm frontal width W to the maximum equivalent arm length r is preferably made as small as is practically and structurally possible, e.g., less than 0.02, so that arms 27 and 37 are preferably long and thin. It will be apparent that as the size of the enclosure and accordingly the diameter of the bubble shearing means increase, the absolute frontal width W must typically be increased to maintain structural integrity. At present the design upper limit on tank enclosure diameters for aerobic sludge digestion in the single enclosure design is 15 feet.

This value is based on the estimated zone of influence of a 12 foot diameter bubble shearing means, which is believed to be about the largest size which will be within the preferred W/r ratio and still be structurally sound.

Preferably, the absolute magnitude of the equivalent arm frontal width, W is also low, i.e., below about 1.5 inches, to minimize the amount of fluid pumping unavoidably performed by the rotating arms. Shear arms 27 and 37 are preferably gently curved away from the direction of rotation to further minimize liquid pumping and to prevent stringy material such as wire or rags from clinging to the arm shearing face. Such materials would greatly increase the form drag and accordingly the power draw.

Rotation of shaft 24 at a relatively high tip speed causes arms 27 and 37 to shear by direct impingement the coarse gas bubbles rising from the sparging assemblies into very fine bubbles. These bubbles then continue to rise substantially freely to the liquid surface 38. In addition, shear arms 27 and 37 generate very small eddy currents of a size similar in magnitude to the size of the rising gas bubble. These eddy currents also shear the rising gas bubbles. Such action results in a very high degree of mass transfer.

Figure 3:
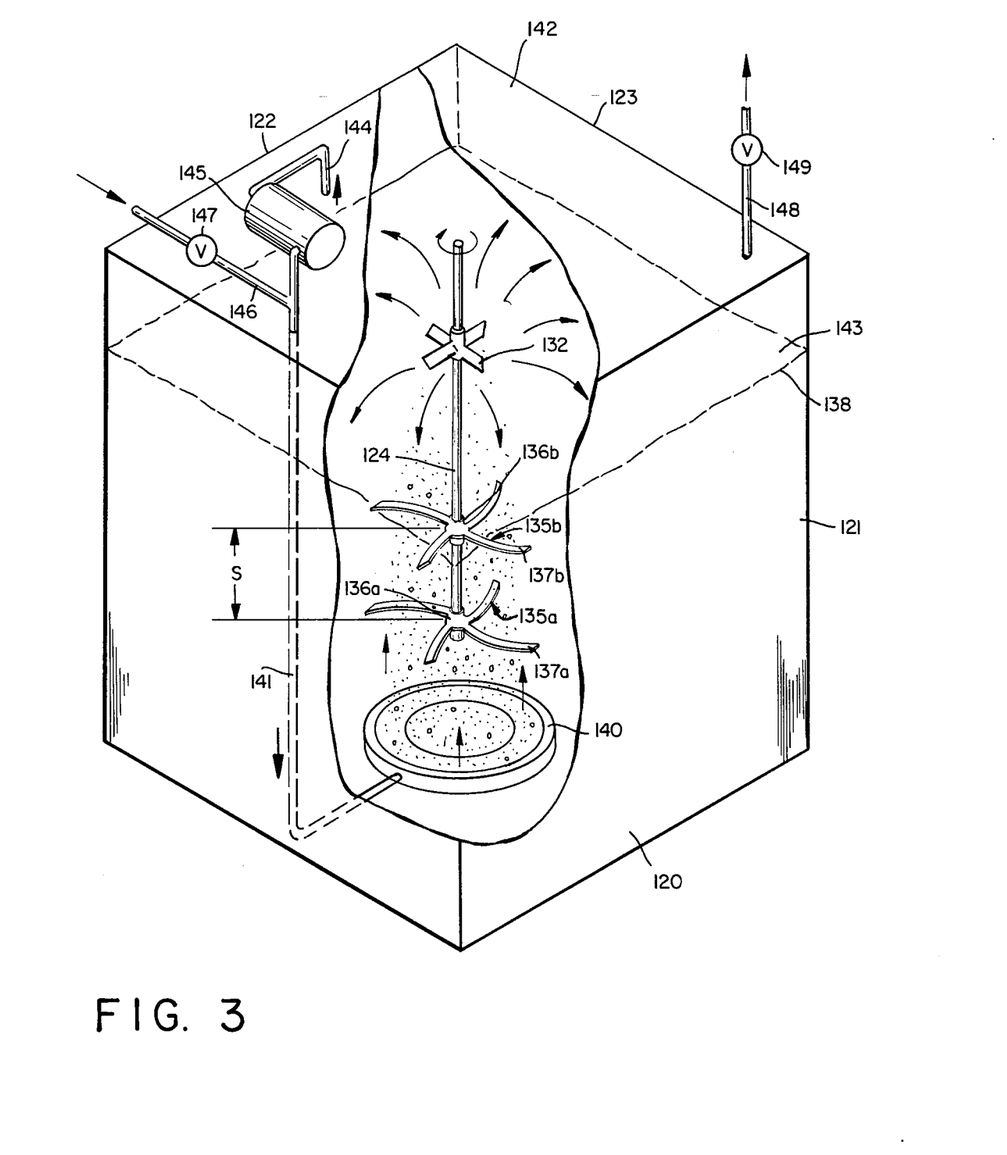
FIG. 3 is a schematic isometric drawing of different apparatus including a stationary gas diffuser ring which may be used to practice the invention.

In the FIG. 3 apparatus, gas is injected through a stationary diffuser ring 140 adjacent floor 120. The diffuser may for example consist of a porous ceramic body (as illustrated) or alternatively could be a donut-shaped pipe with spaced holes. Gas is admitted to diffuser 140 through conduit 141. In this apparatus cover 142 is provided over the gas space 143 above liquid level 138, as it will be assumed that the aeration gas is high purity oxygen and it is desirable to recover unconsumed aeration gas for recirculation. This may be accomplished by overhead conduit 144 and gas recirculation compressor 145. Alternatively or additionally, fresh aeration gas may be introduced to conduit 141 through conduit 146 and valve 147 therein. Spent gas is vented from gas space 143 through conduit 148 and valve 149 therein, spaced from recirculation conduit 144.

Since gas diffuser ring 140 is stationary, it does not also function as bubble shearing means. For this reason, to practice the method of the invention two vertically spaced bubble shearing means 135a and 135b are attached to shaft 124. The shearing means vertical spacing S and the shearing arm frontal width W are dimensioned such that the ratio W/S is between 0.005 and 0.04 for reasons previously discussed. It will be noted that bubble shearing means 135a and 135b each have four symmetrically disposed arms 137a and 137b. Selection of the number and dimensions of such arms is well understood by those skilled in the art, and in its broadest aspect this invention requires only two such arms for each shearing means.

In the FIG. 3 apparatus, the shaft 124 is also fitted with a pitched blade turbine 132, which functions similar to the foam breaker 32 means of the FIG. 2 apparatus. However, turbine 132 differs somewhat in that it is located at a level corresponding to fluid surface 138 rather than being suspended thereabove. The device is designed to minimize the amount of bulk convective mixing in accordance with the objectives of this invention. Nonetheless, the device operates in a well-known manner, throwing coarse droplets of liquid radially outwardly from the axis of shaft 124 thereby preventing the formation of a stable foam.

Figures 4A, 4B, 4C:
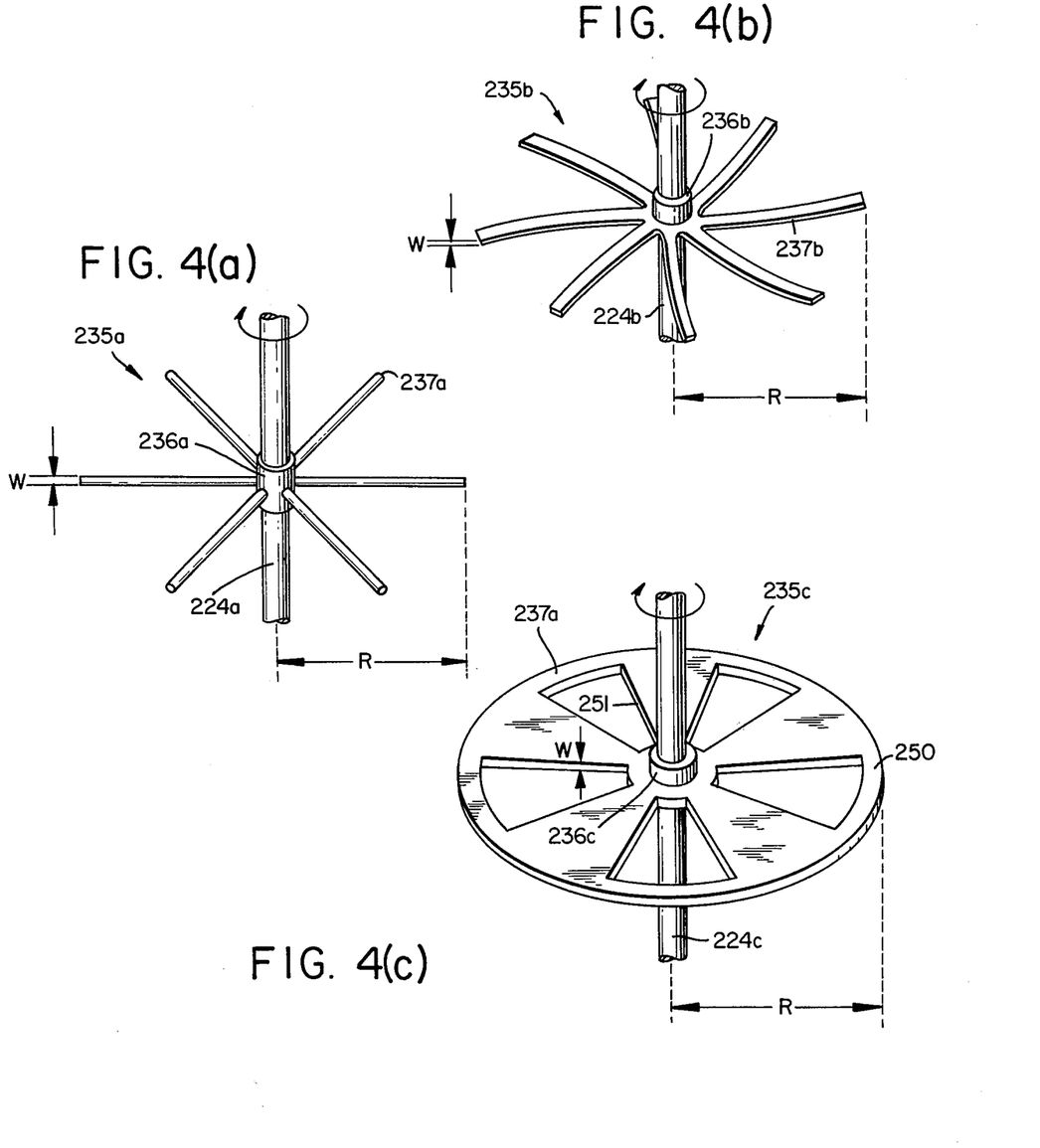
FIGS. 4a, 4b and 4c are detailed schematic drawings of three types of bubble shearing means suitable for practicing this invention.

FIG. 4 illustrates in greater detail, several types of bubble shearing means 235 suitable for practicing the invention. In FIG. 4a, thin circular rods 237a comprise the outwardly extending arms. When means 235a is rotated in the direction of the arrow, the side of rods 237a facing the direction of rotation provide the shearing face. As illustrated, arm equivalent frontal width W is the diameter of rods 237a.

FIG. 4b illustrates long thin flat blades 237b as the outwardly extending arms of bubble shearing means 235b, similar to the construction illustrated in FIGS. 2 and 3.

FIG. 4c illustrates a thin perforated plate 235c as the bubble shearing means, with fan-shaped blades 237c joined by webs 250 as the outwardly extending arms. When plate 235c is rotated in the direction of the arrow, the side 251 of the plate facing the direction of rotation forms the bubble shearing face having width W.

Figure 5:
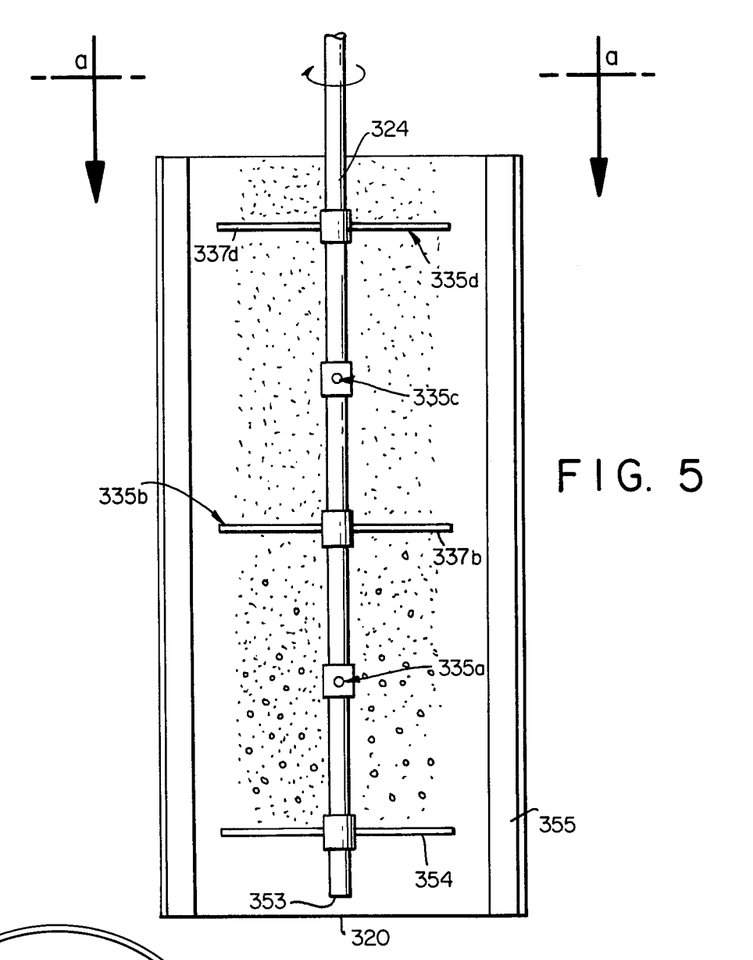
FIGS. 5a and 5b schematic cross-section drawings taken in elevational and plan views, respectively, of gas aeration apparatus particularly suitable for practicing the invention in enclosures having relatively large height to diameter H/D ratios.
Figure 5A:
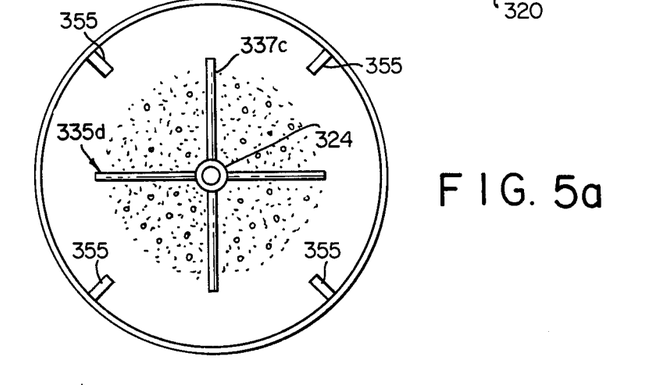

FIG. 5a and 5b illustrate apparatus particularly suited for practicing the invention when the height to width ratio of the enclosure is relatively high, and/or the viscosity of the pseudoplastic liquid-solid mixture being aerated is relatively high. The aeration gas is introduced to the apparatus through rotating shaft 324 and discharged into the lower end of the enclosure through four arm rotating sparger 354 positioned above end 353. Four bubble shearing means 335a through 335d are equally longitudinally spaced and attached to shaft 324. Each bubble shearing means has two long thin arms extending outwardly and spaced 180 degrees apart. The arms on longitudinally adjacent bubble shearing means are positioned 90 degrees out-of-phase. Antiswirl baffles 355 are attached to the inner wall of the enclosure in transversely spaced relation to each other and extending radially inwardly.

By the method of this invention and using the FIG. 5 apparatus, the bubbles rising from the enclosure lower end are repeatedly sheared into minute bubbles as they enter the zones of influence for shearing means 354, 335a, 335b, 335c and 335d.

In the design of apparatus to practice this invention, one has a choice as to the number of shearing arms to employ in a particular bubble shearing means, as well as the number of bubble shearing means to employ on a shaft member (bubble shear assembly). A single shearing arm rotating at a constant speed will: do a certain amount of pumping, draw a given amount of power, generate a certain amount of turbulence, shear a given quantity of gas bubbles and ultimately provide a certain amount of mass transfer. The addition of another shearing arm to a bubble shearing means will generally increase each of these effects. As one might expect, the absolute change in these effects resulting from the addition of another shearing arm is not a constant factor, and a limit will eventually be reached wherein the addition of another shearing arm does not significantly increase the operating effectiveness of a bubble shearing means. Moreover there is probably a preferred balance between increasing shearing action and power consumption for each working embodiment of the invention which can be determined experimentally.

The viscosity of the pseudoplastic liquid-solid mixture to be aerated will influence the number of shearing arms to be used in any bubble shearing means. One important consideration is that the shearing intensity (the rotational speed of the bubble shearing means) necessary for most efficient practice of this invention will be influenced by the local bubble rise velocities. The bubble rise velocity, although a function of the gassing rate and gassing area, is also a function of the mixture viscosity. As the viscosity of the mixture increases the form drag on the rising gas bubbles increases, tending to reduce the bubble rise velocity. As a result, at a given rotational speed and aeration conditions (aeration rate and gassing area), fewer shearing arms need be employed on a bubble shearing means for use in a relatively more viscous mixture than on a bubble shearing means for use in a relatively less viscous mixture to achieve the same bubble shearing capability. Alternatively, for the same construction of the bubble shearing means and a constant aeration condition, the shear assembly in the more viscous mixture could be rotated at a slower speed than the same assembly in the less viscous mixture to achieve the same bubble shearing capability.

Another important consideration is that the power required to rotate a shearing arm is a direct function of the form drag produced by moving the shearing arm through the mixture. The magnitude of this form drag is also influenced by the viscosity of the mixture. Accordingly, for a given power it is possible to rotate a given bubble shearing means at a higher rotational speed in a less viscous mixture than in a more viscous mixture. Conversely, to achieve a similar power drag at a given rotational speed, the bubble shearing means for the more viscous mixture must have fewer shearing arms than the bubble shearing means for the less viscous mixture. For these reasons, fewer shearing arms are needed or desirable on a bubble shearing means for use in a more viscous mixture than for use in a less viscous mixture. As a result of these considerations, it is postulated that in a highly viscous mixture (such as wastewater sludge with a total suspended solids concentration greater than 3.5 weight percent) more than four shearing arms should not be necessary or desirable. In a less viscous mixture more than eight shearing arms should not be necessary or desirable.

As previously explained, the practitioner also has the option of employing additional shearing arms in the form of multiple bubble shearing means, rather than by just increasing the number of shearing arms on a bubble shearing means. For embodiments where the height to width ratio (H/D) of the aeration enclosure is relatively high, additional shearing arms are normally better utilized by adding them in the form of additional bubble shearing means rather than by using more outwardly extending arms on existing bubble shearing means. It is not presently known exactly how one might optimize the configuration for a given aeration enclosure with respect to the number and design of the bubble shearing means. It is, however, speculated that optimization will be primarily a function of the enclosure depth. As the enclosure becomes deeper, one probably improves aeration efficiency and power utilization by spacing a number of bubble shearing means each having a given number of shearing arms along the axis of the shaft, rather than by locating the same number of shearing arms in a fewer number of bubble shearing means. Current practice for this invention is to provide B bubble shearing means equally spaced apart on the shaft member, where B is preferably in the range defined by the equation (3):

$$H/D \leq B \leq H/D + 3 \qquad (3)$$

where H equals the equivalent height (average fluid mixture depth) in the aeration enclosure and D equals the aeration enclosure equivalent diameter. The final design selection depends in a large degree upon the magnitude of the shaft power available and the fluid viscosity. The fluid viscosity has a large influence on gas holdup.

As previously noted, the practitioner also has the option of employing multiple bubble shear assemblies in a given enclosure. This option becomes important when the required treatment volume becomes so large as to require multiple single enclosure designs for adequate treatment. Use of a single tank with multiple shear assemblies may have a large economic advantage relative to multiple single enclosures.

The power drawn by moving the outwardly extending arms of a particular bubble shearing means through a fluid mixture is due primarily to form drag. This is especially true of rods and blades. It has previously been indicated that the magnitude of this power draw and therefore the magnitude of the drag is directly related to the W/r ratio of the bubble shearing assembly. A high W/r ratio indicates a high form drag and a high power draw for the shear assembly. A low W/r ratio as required by this invention provides a low form drag and a low power draw. Prior art paddle or blade aeration systems would nominally be designed at a W/r ratio of about 0.30 to 0.40 whereas the W/r ratio for this invention is below 0.1 and preferably below 0.02. This invention provides a high degree of gas dissolution at relatively low power densities below 1.5 SHP/1000 U.S. gallon capacity of the enclosure.

The equivalent H/D ratio of between 0.5 and 5.0 represents an optimal range which balances the competing elements of economics and mass transfer rate. Generally, as the H/D ratio of an enclosure is increased, the enclosure provides an augmentation in mass transfer due to an increase in the average bubble retention time. However, to realize this increase, one incurs a significant cost due to the change in enclosure design. For example, if a system is designed to provide a one day retention time for a continuous feed stream having a flow rate of 50,000 gal/day, an enclosure volume of 50,000 gal. is required. If this volume is provided in a single tank having an H/D ratio of about 1.75, the tank would have a diameter of 16.9 ft. and a height of 29.6 ft.; while if an H/D = 10 is employed, the tank diameter is reduced to 9.5 ft. while the tank height is increased to 94.8 ft. This change drastically increases the length required for the impeller shaft, increases the difficulty in servicing the vessel interior and mixer means, increases fluid pumping costs, and as one can expect, also greatly increases the cost of the enclosure. In a large enclosure, utilizing more than one high shear means, values of an equivalent H/D above 5 indicate that too many high shear means are being employed in the tank. At the other end of the range, an H/D below about 0.5 means that the enclosure depth is too low to most advantageously utilize the effective increase in retention time of small bubbles due to the increased apparent viscosity of the high solids mixture. For example, in the aforementioned system a tank having an H/D of about 1.0, would have an enclosure height of 20.4 ft.; while with an H/D ratio of 0.25, the enclosure height would be reduced to 8.1 ft. This change also disadvantageously increases the surface area occupied by the enclosure. In preferred practice, the equivalent H/D is maintained in the range of 1.0 to 3.0.

The 25% lower limit on the system maximum equivalent arm length of the bubble shearing assembly as a function of enclosure equivalent diameter represents the minimum fluid-gas contacting area believed necessary to provide sufficient treatment in a given enclosure. With a system maximum equivalent arm length below about 25% of the enclosure equivalent diameter, there would be less than 25% volume utilizaton of the aeration enclosure. Preferably there is at least 50% volume utilization, which requires a system equivalent arm length R of at least 35% of the enclosure equivalent width D.

The W/r ratio of each bubble shearing means is a major determinant of the amount of convective mixing caused by rotation of the high shear means. Since this invention seeks to avoid all convective mixing, this ratio is made as small as is structurally possible; but in any event is below about 0.10. High values for the W/r ratio results in a significant amount of radial and/or axial pumping, which in a high viscosity fluid causes an excessive power loss due to viscous dissipation. In addition to the power loss, the form drag of the bubble shearing means is also increased at larger values of W/r. The larger the form drag, the larger is the overall power requirement. Preferably, the W/r ratio is maintained below about 0.02.

The W/S ratio is between 0.005 and 0.04. A value for the W/S ratio above 0.04 indicates that the bubble shearing means are spaced too closely together. The closer the spacing between adjacent bubble shearing means, the greater the hydraulic interaction between the adjacent shear arms becomes. This increases the convective effects during operation and leads to higher viscous dissipative losses. The effect is similar to that caused by increasing the W/r ratio. An excessively high value of W/S also leads to unnecessary power wastage. The function of the bubble shearing means is to insure that bubbles are resheared into minute bubbles before bubble coalescense and bubble tunneling dominates. By spacing the bubble shearing means too closely, the rising gas bubbles are resheared more than is necessary to augment the enhancement gained in a highly viscous, pseudoplastic fluid by repeatedly reducing bubble size. On the other hand, if the W/S ratio is too low, then the tunneling and bubble coalescence effects begin to dominate and the contacting efficiency decreases. A preferred range for the W/S ratio is between 0.009 and 0.025.

In step (e), the power density is limited to below about 1.50 SHP/1000 U.S. gallon capacity of the enclosure. Values above this level merely increase the quantity of power which is used without significantly increasing gas utilization. At the lower end, the power density must be sufficient to rotate the shaft to perform the shearing function and transform the aeration method from essentially gas diffusion. Typically, the power density will be above about 0.10 SHP/1000 U.S. gallon capacity of the enclosure.

As discussed earlier, the prior art has typically relied upon a two-step energy cascade for mass transfer in which a bulk wise mixing of the fluid makes dissolved gas available to the whole fluid mass. The prior art discloses two ways in which bulkwise fluid convection accomplishes this result. First of all, the convective currents may carry injected gas bubbles into the bulk of the fluid whereupon the gradual decay of these currents into small eddy currents does work on the gas bubbles resulting in mass transfer. Secondly, the convective currents may carry previously dissolved gas, produced for example by a highly localized shearing action, into the bulk of the fluid. Each approach inherently suffers from the inefficiency introduced by viscous dissipation. As stated before, this inefficiency is directly linked to the fluid viscosity. For example, in viscous fluids any attempt to impart momentum to the fluid produces a large efficiency penalty, since the convective step is rapidly dissipated by viscous action. As a result, the two-step energy cascade should be avoided and as taught by this invention, mass transfer is accomplished throughout the bulk of the fluid directly on the scale of the small eddy currents. For the above reasons, aeration bubbles are injected at the lower end of the enclosure at a multiplicity of radial locations with the radius of the outermost location at least 40% of the maximum equivalent length of the bubble shear assembly such that the gas bubbles rising into the liquid-solid mixture pass through a substantial fraction of the area swept by the bubble shearing means. Since this invention preferably avoids any appreciable amount of liquid pumping or convective mixing to insure that the gas is brought into intimate contact with the entire fluid content of the enclosure, initially introducing the gas bubbles over a radial distance less than 40% of the maximum equivalent arm length would result in an inadequate level or degree of aeration at any reasonable expenditure of power. Preferably, the gas bubbles are introduced over a radial distance which is at least 75% of the maximum equivalent arm length r. To insure that the maximum quantity of the gas bubbles rising from the gas injection means are made available to the fluid, it is necessary that the bubble shearing means be provided with shearing arms that sweep an area at least equivalent to the gas injection area.

EXAMPLE 1

In one series of experiments, an aeration system similar in design to the FIG. 2 system was tested in tap water for power characteristics. The test vessel was a 38.5 inch deep cylindrical tank with a 22 inch inside diameter and a sloped floor. The gas injection means comprised a 12 inch diameter two-arm rotating sparger fitted on the end of a hollow shaft with a 0.25 inch equivalent arm frontal width W. The sparging assembly was located near the floor of the test vessel, and also served as a lower bubble shearing means. Spaced 12 inches above the sparger-lower bubble shearing means and fitted onto the same shaft was the upper bubble shearing means. The latter had four 8 inch radially extending arms spaced 90° from one another each having a frontal width of 0.125 inches. The maximum equivalent arm length r, as well as the system maximum equivalent arm length R, for this bubble shear assembly, therefore, was 7.0 inches. The ratio of W/r for the upper and lower bubble shearing means therefore, were 0.036 and 0.018, respectively. In addition and as illustrated in FIG. 4b, each shearing arm was curved away from the direction of rotation of the shaft to further minimize liquid pumping and collection of debris. The aeration assembly was also fitted with a 7 inch diameter pitched blade turbine (PBT) surface aeration device as a foam breaker. The PBT had a 45° pitch and a 1 inch frontal width and the bottom of the PBT was spaced 15 inches above the upper bubble shearing means. During testing, the liquid level was located just below the PBT (zero submergence). The vessel was also fitted with four 3 inch wide baffles spaced 90° apart extending from just above the liquid level in the vessel to just above the rotating sparger. The outermost edge of the baffles were located approximate the outer extent of the shear arms. The rotational speed was 375 RPM.

For comparative purposes, a conventional submerged aeration system was also tested in tap water and 2 weight % solids activated sludge in the same vessel. This system was not fitted with a surface aeration device and consisted solely of a 6 inch diameter two-arm sparger located 28 inches below the liquid level and a 6 inch diameter marine propeller located 4.5 inches above the sparger. The marine propeller discharged axially downwardly onto the two-arm sparger. The rotational speed was 400 RPM, and data on power consumption was collected.

Figure 6:
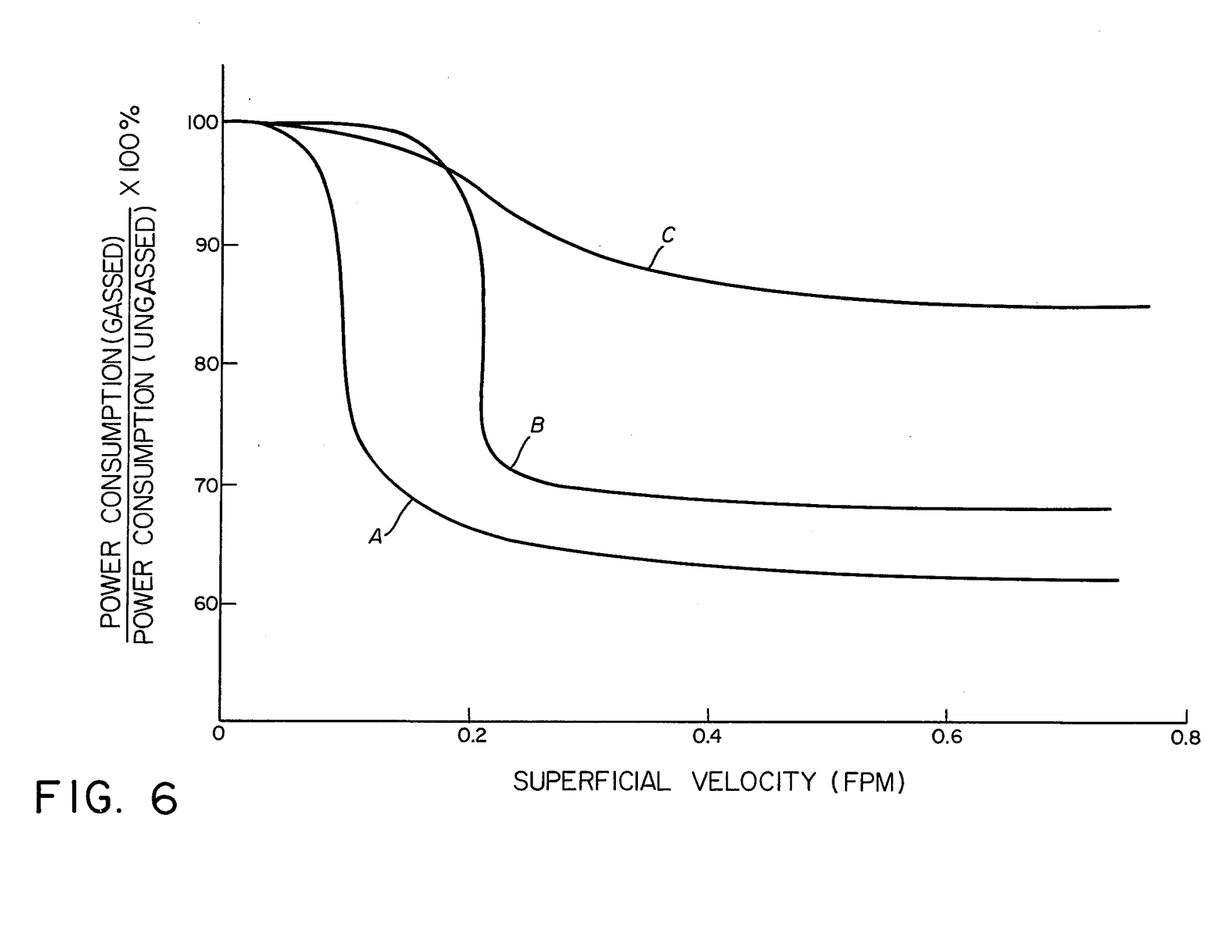
FIG. 6 is a graph showing power consumption as a function of superficial velocity for a prior art marine propeller and the aeration method of this invention.

FIG. 6 is a graph showing the performance of the conventional system in 2 weight % solids activated sludge (curve A) and tap water (curve B), while curve C shows the FIG. 2 system in tap water. In the graph, the ratio of power consumption in the gassed mode to the power consumption in the ungassed mode (power ratio) is plotted as a function of superficial velocity of the aeration gas (feet per minute).

Curve C data shows that the FIG. 2 system is essentially insensitive to the superficial velocity. There is a minor decrease in the power ratio at higher superficial velocities, but this can be attributed more to a change in the density of the gas-liquid mixture than to the phenomenon of flooding. Flooding is that phenomenon whereby the impeller becomes surrounded by a stationary gas envelope and the power drawn by the shaft drops abruptly. Coincidentally, mass transfer also drops abruptly. As shown by the tap water data in curve B for the prior art system, it became flooded in tap water at a gassing rate in the region of 0.2 fpm. In fact, there is over a 20% difference in the power ratio at the higher superficial velocities between the FIG. 2 system and the prior art system operating in tap water. It should be noted that this comparison is conservative since a system will typically flood at a lower gassing rate at lower rotational speeds. Accordingly, if the prior art system had been operated at the same rotational speed of 375 RPM as the FIG. 2 system, it would have experienced flooding at even a lower superficial velocity.

FIG. 6 also shows by comparison of curves A and B that the prior art system operates substantially less efficiently (in terms of power consumption) when used for aeration of a 2weight % liquid-solids mixture as compared with tap water. Although the FIG. 2 system was not operated with a liquid-solids mixture in accordance with this invention, other tests have shown that the power consumption of the present aeration method is less affected by increasing superficial velocity. Stated otherwise, flooding occurs at substantially higher superficial velocities in the practice of this invention as compared with the prior art. Accordingly, one may transfer the oxygen necessary to satisfy a broader range of oxygen uptake rates without exhibiting a serious decrease in operating efficiency.

EXAMPLE 2

The FIG. 2 type apparatus described in Example 1 was used in experiments for practice of this invention to continuously aerate activated sludge derived from wastewater. The following Table A summarizes the key parameters of the system:

Table A

| | |
|---|---|
| Equivalent height H/diameter D | = 2.406 |
| Arm frontal width W/maximum equivalent arm length r | = 0.036 for sparger-lower bubble shearing means |
| Arm frontal width W/maximum equivalent arm length r | = 0.018 for upper bubble shearing means |
| Arm frontal width W/shearing means spacing S | = 0.0104 |
| System maximum equivalent arm length R/enclosure equivalent diameter D | = 0.32 |
| Outermost bubble injection location radius | = 86% of maximum equivalent arm length r |

The operating data for wastewater digestion with this system using 99% oxygen (by volume) aeration gas was as follows:

Table B

| | |
|---|---|
| Sludge Feed Characteristics | |
| Total Solids % | 3.04–3.51 |
| Volatile Solids (%) | 2.34–3.36 |

Table B-continued

| | |
|---|---|
| Temperature (°C.) | 13.5–24.0 |
| Digester Characteristics | |
| Total Solids (%) | 2.42–3.51 |
| Temperature (°C.) | 53.5–60.0 |
| Retention Time (Days) | 1.7–3.7 |
| Volatile Solids Reduction (%) | 16.4–32.6 |
| Shaft Power Density | |
| (SHP/1000 U.S. Gallon) | 0.50–2.52 |

It is known that aerobic digestion of wastewater sludge proceeds more rapidly at elevated temperatures. As temperatures rise from 35° C., the mesophilic microorganisms decline and the thermophilic forms increase. The temperature range of 45° C. to 75° C. is often referred to as the thermophilic range where thermophils predominate and where most mesophils are extinct. Above this range, the thermophils decline, and at 90° C., the system becomes essentially sterile. Because of the more rapid oxidation of sludge, thermophilic digestion achieves more complete removal of biodegradable volatile suspended solids (VSS) than the same period of digestion at ambient temperature. A more stable residue is obtained which can be disposed of without nuisance. It is reported that thermophilic digestion effectively kills or eliminates pathogenic bacertia in the sludge, thereby avoiding a potential health hazard associated with its disposal.

It is also known that the biochemical reaction of wastewater aerobic digestion is exothermic. In this example, the temperature of the feed sludge increased substantially during digestion, i.e., from 13.5°–24.0° C. to 53.5°–60.0° C. during digestion. This indicates that the method was extremely effective in terms of uniformly distributing the oxygen aeration gas through the liquid-solid mixture, so that the exothermic reaction was able to proceed rapidly and heat the mixture to the desired thermophilic range.

EXAMPLE 3

Prior to the Example 2 experiment the same digestion enclosure was used with the submerged marine propeller system described in Example 1, for wastewater aerobic digestion with 99% oxygen (by volume). Gas power consumption data from experiments of this general type are included in Cruve A of FIG. 6. Operating data from these experiments was as follows:

Table C

| | |
|---|---|
| Sludge Feed Characteristics | |
| Total Solids (%) | 3.13–4.04 |
| Volatile Solids (%) | 2.52–2.92 |
| Temperature (°C.) | 19.4–18.7 |
| Digester Characteristics | |
| Total Solids (%) | 2.10–2.99 |
| Temperature (°C.) | 50.4–50.2 |
| Retention Time (Days) | 4.2–4.0 |
| Volatile Solids Reduction (%) | 40.1–30.0 |

The first test was conducted at a lower solids concentration and a longer retention time relative to the second period. However, the difference in the retention time is relatively minor so that within experimental variance one can assume that the data was collected at the same average retention time. It should be noted that the results of the first testing period, as based on the percent volatile solids reduction, are better than those achieved in the second testing period at the higher solids concentration, i.e., the system performed better at the lower solids concentrations. This result is due to the flooding characteristics of the marine propeller system.

Referring back to FIG. 6, the power ratio curve for the prior art system at 2 weight % solids shows that the device floods at a superficial velocity of approximately 0.09 fpm. If the superficial velocity must be above 0.09 fpm in order to supply the required oxygen for the biological process at the 2% solids concentration, then the system would operate in the flooded regime and the operating efficiency of the aeration method would degrade. Since the oxygen uptake rate of a wastewater sludge will increase at increasing solids concentrations thereby requiring higher gassing rates, the physical limitations of the aeration device and the biological requirements of the wastewater sludge are conflicting. Stated otherwise, at increasing sludge solids concentrations a higher superficial velocity is nominally required to supply enough aeration gas to the aeration vessel to satisfy the oxygen demand of the sludge, and the submerged aeration device tends to flood at a correspondingly lower superficial velocity. In effect, at the higher solids concentration the submerged marine propeller system operates continuously in a flooded regime. For this reason, the submerged marine propeller system is less efficient than the method of this invention at higher solids concentrations and must be operated at a lower solids concentrations to preserve efficiency.

EXAMPLE 4

Table D summarizes wastewater aerobic digestion operating data with 99% oxygen gas and the same test vessel as previously described for five different periods; A and B are with the Example 1 marine propeller submerged system and period C, D and E are with the Example 1 high shear system of this invention.

Table D

| | A | B | C | D | E |
|---|---|---|---|---|---|
| Feed Characteristics | | | | | |
| Total Solids | 3.14 | 2.80 | 3.70 | 4.13 | 3.97 |
| Volatile Solids (%) | 2.46 | 2.18 | 2.84 | 3.19 | 2.70 |
| Temperature (°C.) | 17.4 | 24.8 | 19.0 | 23.5 | 21.8 |
| Digester Characteristics | | | | | |
| Total Solids (%) | 2.16 | 2.20 | 3.00 | 3.01 | 3.42 |
| Temperature (°C.) | 47.2 | 47.9 | 55.4 | 56.7 | 57.0 |
| Retention Time (Days) | 4.1 | 2.3 | 2.4 | 2.7 | 2.88 |
| Volatile Solids | | | | | |
| Reduction (%) | 36.3 | 25.8 | 25.8 | 29.8 | 26.0 |

Period A has a long retention time relative to the subsequent testing phases. To a large degree this accounts for the higher volatile solids reduction, but one should note the relatively low solids concentration employed in the digester during this testing phase. Similarly, in the second testing phase (period B) of the marine propeller system, the digester's solids concentration was maintained at an average of 2.20 weight %. Higher solids concentrations were not possible because of the onset of flooding that accompanied the gassing rates required to satisfy the oxygen uptake rates of the sludge under digestion. As noted previously at the higher solids concentration the submerged marine propeller system operates continuously in a flooded regime. For this reason, the submerged marine propeller system must be operated at the lower solids concentrations. At the lower solids concentrations, however, the benefit to be gained from the biological heat released during the digestion process cannot be optimally used. At the lower solids concentration, a much larger quantity of biological heat is necessary to raise the temperature of the fluid mixture because of the greater quantity of water per quantum of biological material. For this reason, the digester temperature during the operation with the marine propeller (periods A and B) was considerably lower than the period of operation with the high shear system of the invention. This result has important process ramifications. For example, pasteurization could not be continuously achieved in the marine propeller system. Continuous temperatures in excess of 50° C. are necessary to insure complete pasteurization in a reasonable time.

In contrast, Table D shows that during periods C, D and E with practice of this invention, the system operated effectively at solids concentrations in excess of 2.5 weight %. In each of these periods the digester temperature was easily maintained above 50° C.

As discussed herein, the method of this invention has particular utility in the aeration of high solids concentration wastewater sludges. Such sludges not only have high apparent viscosities, but also exhibit pseudoplastic behavior. Broadly considered, however, the invention has utility in the aeration of any high solids concentration pseudoplastic liquid-solid mixture. Such mixtures cannot be efficiently aerated by typical prior art methods, but are uniquely suited to the method of this invention. For example, it is well-known that high concentrations of paper pulp in water exhibit pseudoplastic behavior (see for example *Transport Phenomenon*, Bird, Stewart and Lightfoot, John Wiley & Sons, Inc, 1970, pp. 11–13). Therefore, this invention can also be used in contacting paper pulp slurries with gas.

In each application, the high solids concentration pseudoplastic liquid-solid mixture is maintained in the aeration enclosure for the necessary duration to provide the required level of treatment. For example, if the method is being used for the thermophilic aerobic digestion of a wastewater sludge using an enriched oxygen gas, then depending upon the desired degree of treatment, retention times between 4 hours and 10 days are typical. Nonetheless, in certain other uses, as for example paper pulp treatment, for which this invention has potential utility, the mixture retention time must typically be greater than about 15 minutes to insure proper treatment.

Although preferred embodiments of the invention have been described in detail, it will be appreciated that other embodiments are contemplated, along with modifications of the disclosed features, as being within the scope of the invention.

What is claimed is:

1. A method for continuously aerating a high solids concentration pseudoplastic liquid-solid mixture having a total solids concentration of at least 2.5 weight % comprising the steps of:
   (a) providing a liquid-solid mixture aeration enclosure having an equivalent height H to equivalent diameter D ratio H/D between 0.5 and 5.0;
   (b) providing within said enclosure:
      (i) at least one vertical rotatable shaft having at least two bubble shearing means connected thereto each with at least two symmetrically disposed outwardly extending arms forming a bubble shear assembly having a maximum equivalent arm length r;
      (ii) each bubble shearing means with an equivalent arm frontal width W such that W is at a valve which avoids an appreciable amount of pumping of said liquid-solids mixture by said shearing means and the W/r ratio is less than 0.1;
      (iii) having a system maximum equivalent arm length R, such that the system maximum equivalent arm length R is at least 25% of the enclosure equivalent diameter D, and
      (iv) said bubble shearing means being vertically spaced from each other such that the ratio of the arm frontal width W to shearing means vertical spacing S is between 0.005 and 0.04;
   (c) introducing said liquid-solid mixture to said enclosure;
   (d) upwardly injecting aeration gas bubbles at the lower end of said enclosure at a multiplicity of radial locations with the radius of the outermost location at least 40% of the maximum equivalent arm length r such that said gas bubbles freely rise into the liquid-solid mixture and pass through a substantial fraction of the area swept by said bubble shearing means;
   (e) rotating the vertical shaft so as to provide a constant level of turbulence intensity at the level of each bubble shearing means while maintaining the shaft power density below 1.5 SHP/1000 U.S. gallon capacity of said enclosure;
   (f) repeatedly shearing the freely rising gas bubbles by the rotating arms into minute gas bubbles; and
   (g) continuing at least the gas bubble injection (d) and rotating (e) with minimum pumping of said liquid-solid mixture within said enclosure and such that the mixture retention time is at least 15 minutes.

2. A method according to claim 1 in which said liquid-solid mixture is wastewater sludge.

3. A method according to claim 2 in which the mixture retention time is a least 4 hours.

4. A method according to claim 1 in which the H/D ratio of the enclosure is between 1.0 and 3.0.

5. A method according to claim 1 in which the outwardly extending arms of said bubble shearing means of said bubble shear assembly in said enclosure having a system maximum equivalent arm length R at least 35% of the enclosure equivalent diameter D.

6. A method according to claim 1 in which the W/r ratio of the outwardly extending arms of said bubble shearing means is less than 0.02.

7. A process according to claim 1 in which the radius of the outermost location of gas bubble injection is at least 75% of the maximum equivalent arm length r of said bubble shear assembly.

8. A method according to claim 1 in which the shaft power density is between 0.1 and 1.0 SHP/1000 U.S. gallon capacity of the enclosure.

* * * * *

UNITED STATES PATENT AND TRADEMARK OFFICE
CERTIFICATE OF CORRECTION

PATENT NO. : 4,240,905
DATED : December 23, 1980
INVENTOR(S) : Carl Scaccia

It is certified that error appears in the above-identified patent and that said Letters Patent are hereby corrected as shown below:

Column 1, line 26, "hving" should read -- having --.

Claim 1, column 16, line 6, "valve" should read -- value --.

Signed and Sealed this

Twenty-fourth Day of March 1981

[SEAL]

Attest:

RENE D. TEGTMEYER

Attesting Officer    Acting Commissioner of Patents and Trademarks